No. 723,248. PATENTED MAR. 24, 1903.
F. M. DANN.
GATE.
APPLICATION FILED SEPT. 3, 1902.
NO MODEL.
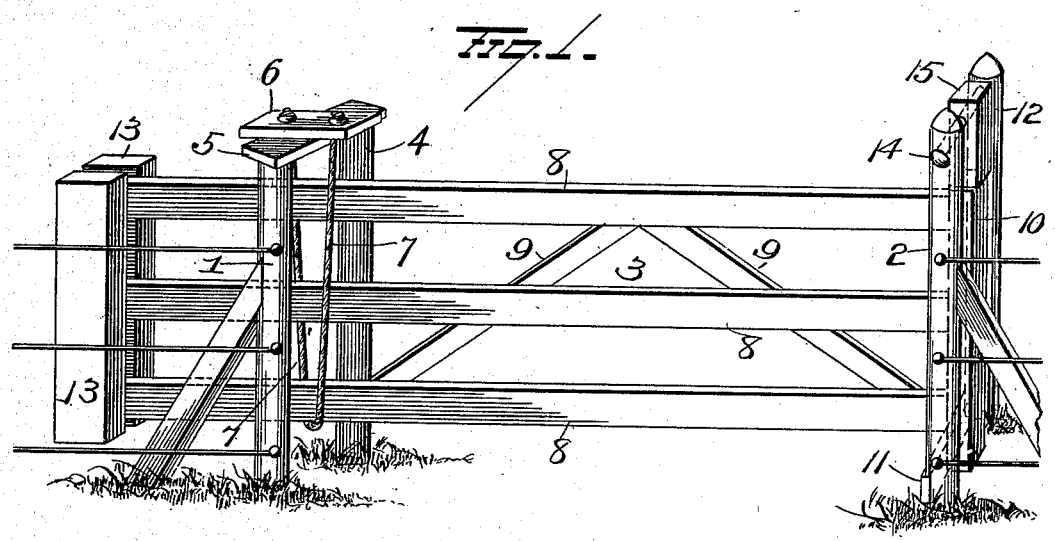
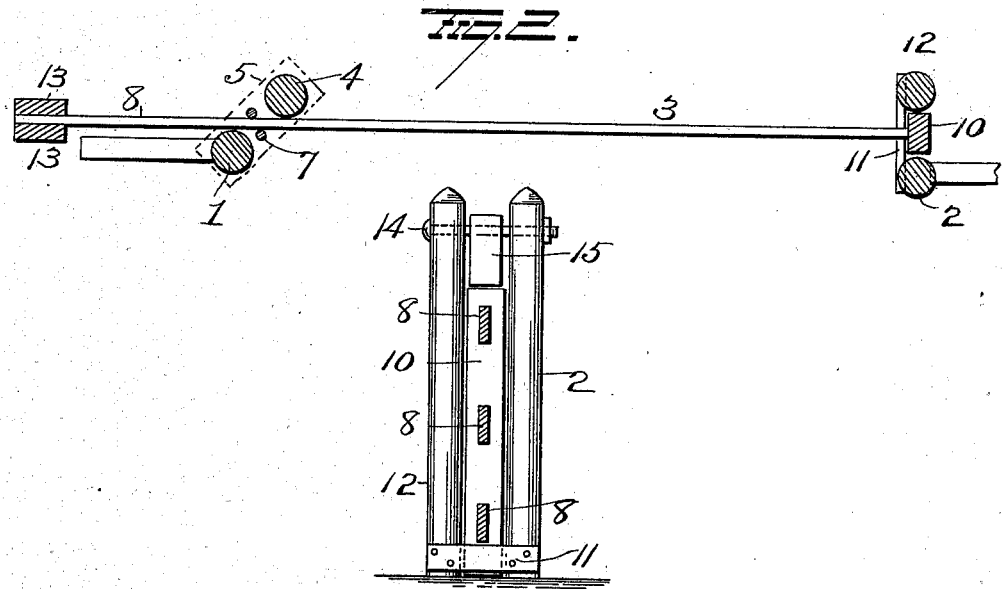
WITNESSES
E. S. Nottingham
G. F. Downing
INVENTOR
F. M. Dann
By H. G. Seymour
Attorney

UNITED STATES PATENT OFFICE.

FRANCIS M. DANN, OF FOOTVILLE, WISCONSIN.

GATE.

SPECIFICATION forming part of Letters Patent No. 723,248, dated March 24, 1903.

Application filed September 3, 1902. Serial No. 121,967. (No model.)

*To all whom it may concern:*

Be it known that I, FRANCIS M. DANN, a resident of Footville, in the county of Rock and State of Wisconsin, have invented certain new and useful Improvements in Gates; and I do hereby declare the following to be a full, clear, and exact description of the invention, such as will enable others skilled in the art to which it appertains to make and use the same.

My invention relates to an improved gate, the object of the invention being to provide a gate in which hinges are dispensed with and which will be of extremely simple construction, cheap to manufacture, balanced so as to be easily and quickly operated and most effectually perform all the necessary functions of a device of this character.

With this object in view the invention consists in certain novel features of construction and combinations and arrangements of parts, as will be more fully hereinafter described, and pointed out in the claims.

In the accompanying drawings, Figure 1 is a view in elevation, illustrating my improvements. Fig. 2 is a view in horizontal section, and Fig. 3 is a view in vertical section.

1 and 2 represent the main fence-posts spaced apart, providing a passage-way through the fence closed by my improved gate 3. Behind post 1 and located slightly in advance thereof is another post 4, connected at its upper end with post 1 by a cross-bar 5, and secured across the latter is another bar 6, to which the respective ends of a rope or cable stirrup 7 are secured. This stirrup 7 is passed beneath the gate 3 near one end and supports this end of the gate.

The gate 3 comprises a series of horizontal bars 8, braced by diagonal braces 9, and a vertical upright 10 at one end of the bars 8 normally rests on the ground behind a cross-bar 11, secured at one end to post 2 and at its other end to a post 12 behind the same. The upper ends of posts 2 and 12 are connected by a bolt 14, on which a block or cleat 15 is pivotally mounted and adapted to rest over the upright 10 of the gate and prevent its being raised until the cleat is swung outward, thus providing additional locking means. The opposite end of the gate has secured thereto on opposite sides heavy vertical bars 13, counterweighting the gate and making its operation easy, as will hereinafter appear.

The operation of my improvements is as follows: The gate in its normal closed position is shown in Fig. 1, with the vertical gate upright 10 resting on the ground behind crossbar 11 and between posts 2 and 12 and cleat 15 disposed above the end upright 10, thus locking the gate in its closed position. The opposite end of the gate is suspended in the flexible stirrup 7. When it is desired to open the gate, cleat 15 is first swung outward and the forward end of the gate elevated slightly to raise post 10 above bar 11, when the gate can be swung longitudinally to move the post 10 from between posts 2 and 12, and when in this position can be swung to its open position, the heavy or counterweighting bars 13 balancing the gate in the stirrup and rendering its movements extremely easy. The closing operation is just the reverse of that above described.

It will be seen that the stirrup 7 serves not only as a hinge to permit the gate to be turned to its open and closed positions, but also as a swing to permit the gate to be moved longitudinally from between posts 2 and 12.

A great many changes might be made in the general form and arrangement of parts described without departing from my invention, and hence I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. The combination with two posts spaced apart and a cross-bar secured to them, of a flexible stirrup suspended from the cross-bar, a gate weighted at one end and supported near its weighted end in said stirrup, parallel posts, and a cross-bar secured thereto behind which one end of the gate is adapted to rest.

2. The combination with a gate weighted at one end, of a flexible stirrup supporting the gate near its weighted end, parallel posts to receive the light end of the gate between them, a cross-bar at the base of these posts behind which the end of the gate rests, and a pivoted cleat between the upper ends of the posts to rest over the end of the gate.

In testimony whereof I have signed this specification in the presence of two subscribing witnesses.

FRANCIS M. DANN.

Witnesses:
JOHN M. WHITEHEAD,
SILAS HAYNOR.